H. C. HOLTHOFF.
LIQUID RHEOSTAT.
APPLICATION FILED JULY 16, 1917.

1,309,802.

Patented July 15, 1919.

Inventor
H. C. Holthoff
by
Attorney

UNITED STATES PATENT OFFICE.

HENRY C. HOLTHOFF, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

LIQUID RHEOSTAT.

1,309,802.  Specification of Letters Patent.  Patented July 15, 1919.

Application filed July 16, 1917. Serial No. 181,424.

*To all whom it may concern:*

Be it known that I, HENRY C. HOLTHOFF, a citizen of the United States of America, residing at Milwaukee, in the county of Milwaukee and State of Wisconsin, have invented a certain new and useful Improvement in Liquid Rheostats, of which the following is a specification.

This invention relates in general to liquid rheostats such as are useful in controlling the resistance of electrical circuits.

In liquid rheostats, of the type wherein fluid electrolyte is admitted to and discharged from an electrode-containing compartment for the purpose of varying the resistance of the electrical circuit in which the electrodes are included, it is very desirable that provisions be made for permitting rapid discharge of the electrolyte from the electrode-containing compartment when it is desired to rupture the circuit. This is especially the case where a liquid rheostat of this character is used for controlling an induction motor, the rheostat being in circuit with the secondary winding of the motor. In such installations, when it is desirable to stop the motor in a short interval of time, it is quite desirable or necessary to quickly discharge the electrolyte from the electrode-containing compartment of the rheostat to permit opening of the primary switch as quickly as possible without dangerous sparking at the contacts thereof. However, while this quick discharge is desirable, unless special provisions are made to prevent it, the upper surface of the eletrolyte in which the electrodes are immersed will not remain horizontal during discharge, but may be considerably lower adjacent the discharge point than at points remote therefrom, with the consequent result that the resistance or resistances of and current or currents in the paths between the several electrodes are more or less badly unbalanced. Again, it is very desirable that the fluid electrolyte that has become heated in the electrode-containing compartment circulate freely to maintain the temperature of the electrolyte as low as possible, thus contributing to the general efficiency of the apparatus.

In accordance with the present invention, a special form of discharge-controlling gate for the electrode-containing compartment of the rheostat is provided, this gate being of such a character as to be capable of operation with comparatively little effort and to permit full discharge from the electrode-containing compartment in a minimum time while insuring that the surface of the body of electrolyte is substantially horizontal during discharge to thereby maintain a condition of substantial electrical balance of the several phase circuits in which the electrodes are connected.

It is an object of this invention to provide a liquid rheostat having improved means for controlling the degree of immersion of electrodes in electrolyte.

It is a further object of this invention to provide a liquid rheostat of improved construction embodying means for providing for a quick discharge of electrolyte from an electrode-containing compartment while substantially avoiding a condition of electrical unbalance of the circuits in which the electrodes are connected.

It is a further object of this invention to provide a liquid rheostat of improved construction wherein electrolyte is circulated through a reservoir or storage compartment and an electrode-containing compartment, and the means for controlling the discharge from the latter compartment is in the form of a plurality of gates capable of simultaneous operation and providing parallel discharge paths.

These and other objects and advantages are attained by this invention, the various novel features of which will appear from the description and drawings, disclosing one embodiment of the invention, and will be particularly pointed out in the claims.

Figures 1, 2:
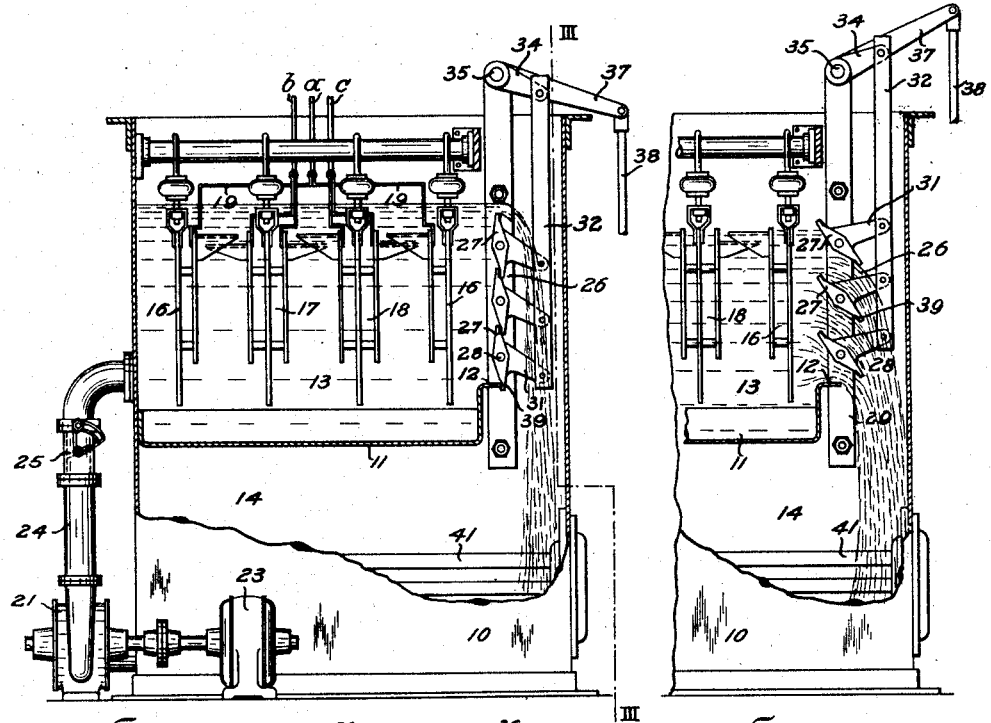
Figure 1 is a view in elevation, partly in section, of a liquid rheostat embodying features of this invention.
Fig. 2 is a fragmentary view similar to Fig. 1 showing the discharge-controlling means of the rheostat in open position.
Figure 3:
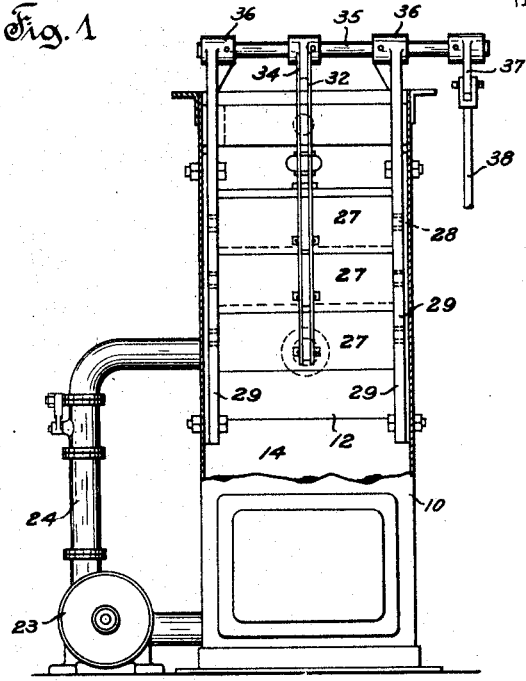
Fig. 3 is a view in elevation, partly in section, along the line 3—3 of Fig. 1.

In the embodiment of the invention disclosed, the rheostat is of the polyphase type such as may be used for varying the resistance of the secondary circuit of a three-phase, wound-rotor induction motor. The rheostat comprises a casing 10 divided by a tray-like partition 11, having a discharge lip 12 at one side along the upper edge thereof, into upper and lower compartments 13 and 14, respectively. Electrodes 16, 17, and 18 are mounted in fixed position, suspended from their upper ends, in the upper compartment 13, the electrode 16 being in two sections at opposite sides of the electrodes 17 and 18 and connected by a bridging element 19, the three electrodes being connected to a polyphase electric circuit $a$, $b$, $c$. These electrodes may be of any suitable form, but each preferably consists of one or more metal plates spaced apart and rigidly secured in position.

The lower compartment 14 of the casing 10 acts as a reservoir or storage compartment for liquid resistance material. A pump 21 driven by a motor 23, or any other suitable means, has its inlet in communication with the compartment 14 and acts to force the resistance material through a pipe or conduit 24 to the upper or electrode-containing compartment 13. This inlet pipe 24 may be provided with an adjustable valve 25, here shown as of the butterfly type, for varying the rate of flow of electrolyte to the compartment 13.

The tray or partition 11 is secured to the casing 10 at three sides, and the upper compartment 13 is formed by the tray and the side walls of the casing and is closed at the fourth side by a movable partition or gate, generally indicated at 26, which is spaced from the fourth side of the casing, the general arrangement of the parts being such that the space between the fourth side of the casing and the movable partition or gate 26 serves as an overflow and discharge passage to carry liquid resistance material from the upper to the lower compartment. The depth of the tray or partition 11 is such that there may always be an appreciable amount of liquid in the tray in contact with the lower ends of the electrodes 16, 17, 18 which project into the tray, as generally indicated in the drawings. When the rheostat is used in the secondary circuit of an induction motor, this arrangement serves to maintain the secondary circuit of the motor in closed condition at all times, although the resistance of the circuit may be quite high when the movable partition 26 is in open position.

It is apparent that the resistance in the circuit to be controlled, that is, the circuit $a$, $b$, $c$ varies inversely as the amount of electrolyte in contact with the electrodes in the upper compartment 13. For varying the amount of such electrolyte, and thus varying the resistance, and for accomplishing this variation, especially as to the feature of discharging electrolyte from the electrode-containing compartment, in a minimum amount of time, the movable partition 26 is in the form of a plurality of separate gates or shutters 27, preferably of the butterfly type and adapted to close upon each other and the discharge lip 12 of the tray 11, as indicated. These gates or shutters 27 are each provided with pintles 28 mounted in bearings in supporting bars 29 secured to the sides of the casing 10. Any other suitable means to mount the shutters for swinging movement may be provided. Operating arms or extensions 31 are connected to or integral with the gates 27, and these arms or extensions are loosely connected to an operating rod 32, which may be in a single piece as indicated or in divided sections. At its upper end, the operating rod 32 is connected to an arm 34 mounted on a shaft 35 which is rotatable in bearings 36 provided at the upper ends of the supporting bars 29. However, any suitable support for the bearings 36 may be used. An actuating arm 37 is secured to the shaft 35 and has connected thereto an operating rod 38 whereby power may be supplied to the shaft 35 for causing the operation of the gates or shutters 27 to open or closed position.

The edges of the gates or shutters 27 where they engage with each other and the discharge lip 12 of the tray 11 may have machined surfaces to provide a close fit to thereby prevent or reduce to a minimum leakage from the electrode-containing compartment. These shutters may also be provided with packing strips 39 to further reduce any tendency toward leakage.

The lower compartment may be provided with a plurality of cooling pipes or conduits 41, as indicated, or any other means for forcing air or other cooling fluid into engagement with surfaces heated by the electrolyte to thereby assist in cooling the latter.

Considering Fig. 1 of the drawings, it may be assumed that the rod 38 has just been actuated to turn the gates or shutters to closed position, as indicated. The pump 21, which may be considered as in continuous operation, forces liquid resistance material to the upper compartment 13, the level of such material rising until it reaches a point where material overflows the upper edge of the upper one of the gates or shutters 27. With the gates or shutters in closed position, it will be apparent that the rate at which the compartment 13 is filled, or, with the rheostat connected in a motor circuit, the rate at which the motor is accelerated, may be varied by adjusting the valve 25.

In stopping the motor or other translating device with which the rheostat is associated, the operating rod 38 is actuated to cause opening movement of the gates or shutters, as indicated in Fig. 2, at which time a practically unobstructed passage is provided which extends throughout substantially the entire side of the electrode-containing compartment 13.

Due to the fact that the gates are pivoted and are subjected to substantially the same pressure on both the upper and lower sides of their pivotal points, movement of the gates to open position is not resisted to any great extent by the pressure exerted thereon by the electrolyte in the compartment 13. In fact, by proper positioning of the pivotal point of a shutter, the pressures exerted thereon by electrolyte, when the shutter is submerged, may be in substantial balance.

During the normal operation of a motor or other translating device with which the rheostat is associated, it is desirable that the pump 21 operate to circulate the resistance fluid continuously through the upper and lower compartments. The rate at which this circulation takes place is generally determined by the maximum desirable temperature of the electrolyte in the upper compartment and may, if desired, be varied by adjusting the valve 25 in the conduit 24. With the shutters 27 in fully closed position, as indicated in Fig. 1, fluid that becomes heated through use as a resistance element in the upper compartment 13 passes off at its upper level and is discharged over the upper edge of the upper one of the gates 27.

While, under some circumstances, it may be desirable to maintain the gates in fully closed position, as indicated in Fig. 1, during normal operation of the motor, thus causing all overflow of the electrolyte to occur over the upper edge of the upper one of the gates 27, nevertheless, it may be desirable that a part of the discharge of electrolyte from the compartment 13 during normal operation of the rheostat be through the several discharge passages formed between the several gates 27 and between the lower one of said gates and the discharge lip 12. These discharge passages may be of such size as to accommodate only a portion of the total overflow from the upper compartment, the remainder passing over the upper edge of the upper shutter, or may be such as to accommodate the entire overflow. In any case, all the heated resistance material passing from engagement with the electrodes is not forced to ascend to the upper level of the electrolyte in order to pass to a point of discharge from the electrode-containing compartment.

It will be apparent that the level of electrolyte in the electrode-containing compartment may be maintained at almost any predetermined point between the discharge lip 12 of the tray 11 and the upper edge of the upper gate 27, this variation of level in the compartment 13 being attained by varying the degree of opening between the several gates 27 and between the lower one of these gates and the discharge lip 12.

It will be apparent that by using this multiple shutter type of discharge-controlling gate, a discharge opening equal to considerably greater than one half or two thirds of one side of the electrode-containing compartment is obtained in an inappreciable interval of time, and this without requiring the application of any great power for opening the shutters due to the fact that the pressures on opposite sides of the pivotal points of the individual shutters are fairly well balanced. In fact, it has been determined that the electrode-containing compartment may be emptied to the level of the discharge lip 12 in less than two seconds. A general effect of the improved rheostat structure and the operation thereof may be described as such as provides for a maximum discharge opening in a minimum time and with minimum resistance to operation. Further, the fact that a plurality of discharge paths are provided at different levels insures that a considerable portion of the electrolyte will pass off at various levels, thus preventing the lowering of the electrolyte level at the discharge side of the compartment appreciably below that at the side remote from the discharge side, this feature insuring that the resistance of and current in the several phase circuits in which the electrodes are connected remain in substantial balance during the entire discharge.

While the greatest advantages of this type of multiple shutter rheostat gate are present when the shutters are pivotally mounted about horizontal axes, certain advantages are secured when the shutters are mounted with their axes inclined to the horizontal at any angle, even at an angle of ninety degrees.

It should be understood that it is not desired that the invention claimed be limited to the exact details of construction shown and described for obvious modifications will occur to a person skilled in the art.

It is claimed and desired to secure by Letters Patent:

1. A liquid rheostat comprising a plurality of compartments, electrodes adapted to be immersed in liquid in the upper one of said compartments, means for circulating liquid between said compartments, and adjustable means for varying the level of liquid in the upper one of said compartments, said means comprising a plurality of simultaneously operable pivoted-shutter gates providing parallel discharge paths for the liquid.

2. A liquid rheostat comprising a casing, and a partition dividing said casing into a plurality of compartments one above another, said partition being spaced from a portion of the wall of said casing, a portion of that side of the upper compartment adjacent the latter portion of the casing wall being in the form of an adjustable discharge-controlling gate, said gate comprising a plurality of adjustable valves coöperative with each other to form an effective closure and simultaneously operative to provide a plurality of discharge paths for the liquid in said upper compartment.

3. A liquid rheostat comprising a casing, a partition dividing said casing into a plurality of compartments one above another, said partition being spaced from the wall of said casing at one point, that side of the upper compartment adjacent the latter portion of the casing wall being provided with an adjustable gate constituting a weir permitting liquid to overflow from said upper compartment and to be discharged directly into the lower compartment, said gate comprising a plurality of simultaneously operable pivoted valves coöperative with each other to form a closure therebetween and operative to provide parallel discharge paths at different levels.

4. A liquid rheostat comprising a casing, a partition in the form of a comparatively shallow tray dividing said casing into a plurality of compartments one above another, said partition being spaced from the wall of said casing at one point, an adjustable gate associated with said tray at said latter point and constituting an adjustable weir for the compartment formed at the upper side of said partition, said gate comprising a plurality of pivoted shutter valves one above another providing a plurality of parallel discharge paths at different levels, and means operative to cause the simultaneous operation of said valves.

5. A liquid rheostat comprising a casing, means within said casing forming a compartment separate from the body portion of the casing, electrodes immersible in liquid resistance material within said compartment, a portion of the wall of said compartment being in the form of a gate adjustable to control the discharge of liquid resistance material from said compartment, said gate comprising a plurality of pivoted shutter valves one above another and engageable one with another to form a closure therebetween, and means for causing the simultaneous operation of said valves whereby a plurality of discharge paths at different levels are provided for the liquid resistance material in said compartment.

6. A liquid rheostat comprising an electrode-containing compartment and a reservoir compartment, said electrode-containing compartment being supported by said reservoir compartment and located above a substantial part of the liquid-containing portion of the reservoir compartment whereby liquid resistance material may flow by gravity from said electrode-containing compartment to said reservoir compartment, said electrode-containing compartment being provided with a discharge opening communicating with said reservoir compartment, and an overflow wall or weir element for controlling said discharge opening and adjustably determining the level at which liquid resistance material may overflow from said electrode-containing compartment, said overflow wall comprising a plurality of pivoted shutter elements operative to provide a plurality of parallel discharge paths for liquid resistance material in said electrode-containing compartment.

7. A liquid rheostat comprising a casing, a tray-like partition in said casing dividing said casing into upper and lower compartments, adjustable discharge-controlling means for said upper compartment, said discharge-controlling means comprising a plurality of pivoted shutters disposed one above another, the lower one of said shutters coöperating with the discharge edge of said tray, and means for causing the simultaneous operation of said shutters to open position to provide a plurality of separate discharge paths for said liquid at different levels.

8. A liquid rheostat comprising a casing, electrodes adapted to be immersed in liquid in said casing, a plurality of superposed and pivoted shutter valves effective to provide a plurality of parallel discharge paths at different levels for liquid in said casing, and means operative to cause the simultaneous actuation of said valves.

9. A liquid rheostat comprising a casing, electrodes adapted to be immersed in liquid in said casing, and means for controlling the discharge of liquid from said casing, said discharge-controlling means being in the form of a multiple shutter gate providing for the discharge of liquid from the casing in a plurality of parallel streams.

10. A liquid rheostat comprising a casing, electrodes adapted to be immersed in liquid in said casing, and means for controlling the discharge of liquid from said casing, said means comprising a plurality of simultaneously operable shutter valves each of which is pivoted at an intermediate point and has surfaces at both sides of the pivotal axis exposed to the pressure of liquid in said casing whereby the force resisting operation of the valve is balanced to an effective degree.

11. A liquid rheostat, comprising a casing, electrodes adapted to be immersed in liquid in said casing, and means for determining the level of liquid in said casing and controlling the discharge of liquid from said casing, said means comprising a plurality of pivotally mounted gates coöperative with each other to form a closure therebetween, the pivotal axis of each gate passing through an intermediate part of the gate whereby the forces due to the pressure of liquid resisting operation of the gate are balanced to an effective degree.

12. In a liquid rheostat, a casing for containing liquid, electrodes disposed in said casing, and means for determining the level of liquid in said casing and controlling the discharge of liquid therefrom, said means comprising a swingably mounted gate extending in substantially opposite directions from the axis of rotation.

13. In a liquid rheostat, a casing for containing liquid, electrodes disposed in said casing, and means for determining the level of liquid in said casing and controlling the discharge of liquid therefrom, said means comprising a swingably mounted gate extending in substantially opposite directions from the axis of rotation and providing for a discharge of liquid from said tank at different levels.

In testimony whereof, the signature of the inventor is affixed hereto.

HENRY C. HOLTHOFF.

Copies of this patent may be obtained for five cents each, by addressing the "Commissioner of Patents, Washington, D. C."